June 14, 1932. A. J. BERG 1,863,553
APPARATUS FOR SECURING METAL FINS TO TUBES OR CYLINDERS
Filed Jan. 25, 1928 2 Sheets-Sheet 1
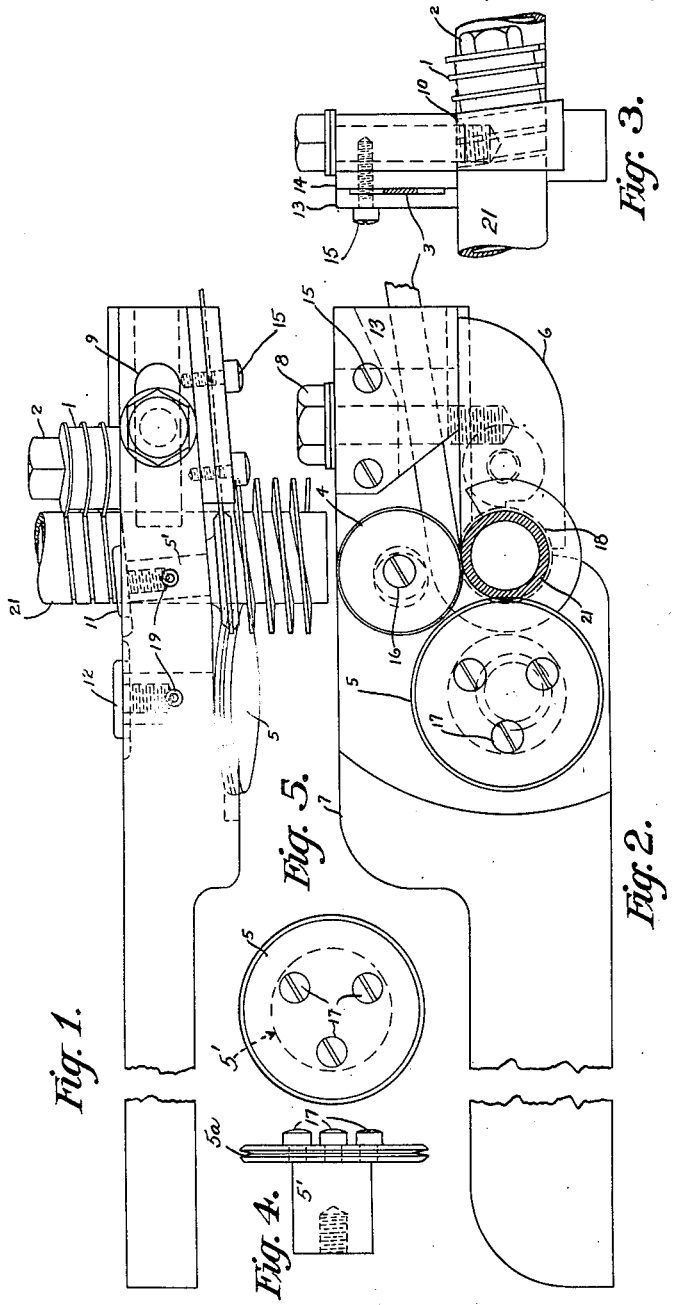
ALFRED J. BERG.
INVENTOR.
BY Harold Dodd
ATTORNEYS.

June 14, 1932.  A. J. BERG  1,863,553
APPARATUS FOR SECURING METAL FINS TO TUBES OR CYLINDERS
Filed Jan. 25, 1928  2 Sheets-Sheet 2
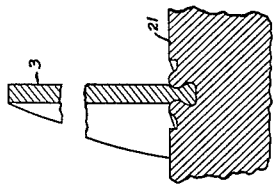
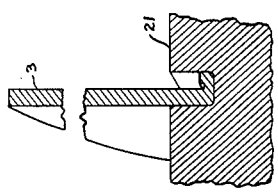
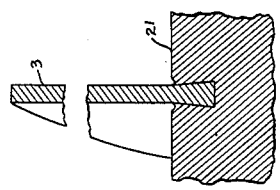
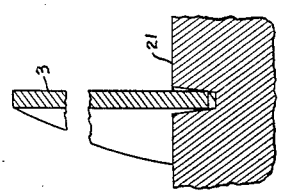
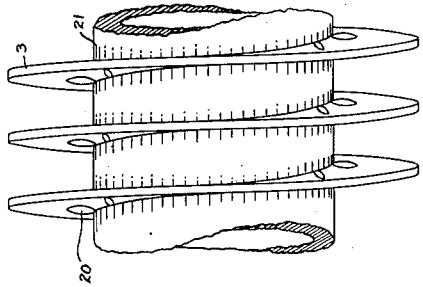
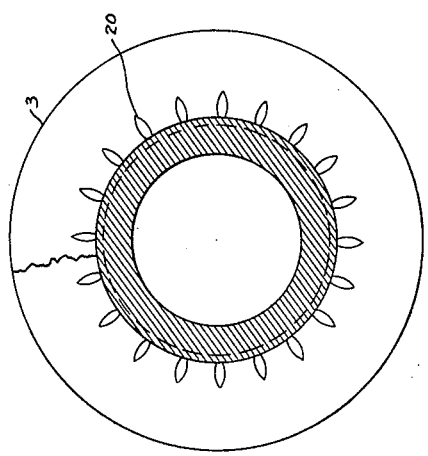
ALFRED J. BERG
INVENTOR.
BY Harold Dodd
ATTORNEYS.

Patented June 14, 1932

1,863,553

UNITED STATES PATENT OFFICE

ALFRED J. BERG, OF PORTSMOUTH, NEW HAMPSHIRE, ASSIGNOR OF ONE-THIRD TO PAUL F. FOSTER, UNITED STATES NAVY AND ONE-THIRD TO JOHN O. HUSE, OF BALTIMORE, MARYLAND

APPARATUS FOR SECURING METAL FINS TO TUBES OR CYLINDERS

Original application filed August 6, 1926, Serial No. 127,692. Divided and this application filed January 25, 1928. Serial No. 249,404.

(GRANTED UNDER THE ACT OF MARCH 3, 1883, AS AMENDED APRIL 30, 1928; 370 O. G. 757)

My invention relates broadly to metal working and more particularly to methods and apparatus for securing thin metal heat radiating fins on tubes or cylinders of small diameter, and is a divisional case of my application Number 127,692.

The object of my invention is to provide an effective yet inexpensive method of and tool or apparatus for securing a strip of metal in and about the periphery of a cylindrical member, in such a manner that the rate of heat transfer from within the tube to the tip of the fin or vice versa is greatly increased.

Another object of my invention is to provide a method of securing a strip of metal in and about the periphery of the cylindrical member that is rapid in operation and applicable to quantity production of the above described article of manufacture.

A further object of my invention is to produce a finned tube in which it is not necessary to braze or solder the fin to the tube to produce a substantially integral contact between the fin and the metal of the tube.

Heretofore in the production of cylinders of the finned type it has been customary to either cast the fin integral with the cylinder, or, in the case of a heat radiating strip that is mechanically fastened to the tube or cylinder, to weld or braze the abutting surfaces together.

The casting method involves the disadvantage of expensive patterns and molding apparatus with the resultant product brittle and fragile unless very thoroughly annealed. Both of these factors are an impediment to speedy production of finned tubes upon a large scale of production at a low price.

The welding and brazing method is slow, tedious and expensive and often fails to give a sufficiently rigid and efficient joint to allow a ready transfer of heat through the tube. Further, as the brazing or soldering metal must have a lower melting point than the metal of the tube and fin this type of tube may not be used where the temperature of the tube raises to a point near the melting point of the tube itself. Besides such brazing or soldering heat takes the drawn temper out of the tubes and leaves them weaker and more liable to bending and indentation.

My invention, however, eliminates these objections and produces a tube in which the physical contact of the fin and the tube is such that the two might be termed as substantially integral because of the intimate contact of the surfaces of the metal of the fin and of the metal of the tube. This intimate contact is produced by the pressure of the metal of the tube tending to expand due to the method of attaching the fin to the tube and in addition to this, the tendency of the metal of the tube to expand into the metal of the fin, which tendency is created by the crimping and upsetting of the metal of the tube in close proximity to the fin as a final step in the production of the finished product.

My invention consists substantially in the method and apparatus, together with the parts associated therewith in the production of a finned tube of the character described above or as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which Figure 1 is an elevational view of my combined groove forming and strip inserting tool, Figure 2 is a top plan view thereof, Figure 3 is an end view thereof in elevation, Figure 4 is a detail side view of the crimping wheel, Figure 5 is a detailed end view thereof, Figures 6, 7, 8 and 9 illustrate several steps in the production of finned tubes with various fastening arrangements, and Figures 10 and 11 end and side views of a tube which constitutes the finished product.

Referring particularly to Figures 1, 2, and 3 the tool body proper consists of a wrought steel member 7 which is cut at one end to fit a standard tool post and tapered in thickness at the other end, one side of the tool body, however being a straight line as shown in detail in Figure 1. The tapered end of the tool body corresponds approximately to the pitch of the fin upon the completed tube, but by changing its position in said tool post said pitch may be changed.

A portion of the tapered section of the member 7 is recessed to form a section that is parallel to the straight side of the member in longitudinal relationship but slanted from the vertical plane to such an angle that it coincides with the slant of the fin upon the completed tube.

Upon this recessed portion is mounted the crimp wheel 5 that carries a spindle 5' which extends through the body portion 7 and terminates in a thrust fastening element 12. I have provided an oil hole 19 to enable proper lubrication of the spindle 5' in its rotary movement in the body portion 7.

As illustrated in Figure 2 the under portion of the member 7 is recessed to accommodate the unfinished tube 21 in such a manner that when the element 6 is in position, the recessed portion of the member 7 and the arcuate portion of the member 6 form a cylindrical passage through the tool of a diameter similar to that of the tube 21. The lower end of the arcuate portion of the element 6 is so formed by its diameter relative to tube 21 and by the slot 6a therein, both said diameter and slot being adjustable by the adjustment of member 6 on the tool body and retained in each adjusted position by screw 8, so that as the tube rotates the edges of slot 6a and of said arcuate portion will remove any burr from the tube that is left by the cutters or rollers 1 hereinafter termed groove formers which are mounted upon one side of the element 6 while upon the opposite side of element 6 the ribbon 3 is wound into said groove in the tube, said cutters or rollers being arranged in such a manner that they extend into the passage between the element 6 and the recessed portion of the member 7, to a depth corresponding to the depth of the groove into which the fin is to be wound.

The element 6 is rigidly mounted upon the member 7 by means of a clamp screw 8 which passes through a slot 9. The rotary cutters 1 are mounted upon the element 6 by means of a spindle bolt 2 which is threaded into the element 6.

The element 6 also has one side bevelled to correspond to the taper of the member 7 but a little offset therefrom to form a guide surface for the strip 3. The strip 3 is firmly held against the bevelled surface of the element 6 by means of a recessed plate 13 and pressure screws 15.

In alignment with the guide face of the element 6 and the crimp wheel 5 is a lead wheel 4 which is mounted upon a spindle 11 that extends through the body portion 7 and is provided with an oiler conduit 19. This lead wheel preferably consists of two metallic discs, spaced apart approximately a distance equal to the thickness of the strip. These discs are free to rotate with the spindle along an axis which is positioned at an angle to the tool body, the angle corresponding to the angle of taper of the member 7, the bevel of the element 6 and the angle of pitch of the fin to be wound upon the tube.

Although I do not intend to limit myself to any particular type of groove former for the purposes of a clearer description of the operation of my device, one form of cutter may be of a shape to form a groove having parallel side walls as shown in Figure 8, or for another it may be such that the resultant groove will have divergent side walls as shown in Figure 6. The groove shown in Figure 8 is of greater width than the groove shown in Figure 6, the purpose of which will later become apparent as the description of the operation of the machine is discussed with the different types of cutters mentioned above.

The operations in the process of forming a finned tube in which my apparatus would be involved are as follows: When the tool body is rigidly fastened in the post of a standard lathe which is equipped with thread cutting gearing, and when the tube is revolubly mounted between the centers of the lathe and the chuck in the usual manner, and started to rotating, the tripple groove former is advanced so that the element with the largest offset in stepped groove former leaves a groove of the required depth.

As illustrated to advantage in Figure 2 the metal ribbon may be led from a suitable carrier such as a spool or the like (not shown) and passed between the guide plates 13 and 14 whose screws 15 place longitudinal tension upon said ribbon 3 as it is wound about the member 21. The strip may be extended into the peripheral groove of lead wheel 4, and with the tube 21 rotating in the proper direction, the operation of the apparatus may proceed. With the cutters or groove formers 1 arranged to provide a groove such as shown in Figure 6, and the wheel 4 arranged so that its fin or strip receiving groove is in alignment with the spiral groove formed by the members 1, the wheel 4 operates to serve two purposes, first, that of bending the strip 3 to conform to the contour of the tube 21, and secondly that of forcing the inner edge of the strip 3 into the prepared groove. These functions of the wheel 4 are carried out simultaneously as clearly illustrated in Figure 2. In fact, it may be said, that the bending operation of the strip occurs simultaneously with its insertion into the groove prepared in the tube.

The bending of the strip into spiral form usually causes its inner edge to buckle or wrinkle, but the herein disclosed manner in which I support the strips during this operation causes the inner edge thereof to thicken appreciably, which thickening takes place during the time the edge of the strip is being forced into the groove of the tube. This operation is best illustrated in Figures 6 and 7.

As shown in these figures, the strip 3 is inserted into the groove in the tube 21 as aforesaid and as it is bent and as its inner edge is forced against the bottom of the groove, said edge is upset and thickened by the compression of its material into a lesser diameter, forcing the strip into intimate contact with the side walls as well as the bottom of the groove. When certain materials of the strip and tubes are used, the sides of the groove may actually be forced outward as the material forming the fin is thickened at its inner edge by said compression force, as shown particularly in Figure 7. Said compression force also forms a slight dish in, and extending longitudinally of, said fin, the extent of said dish being limited by the bevel or taper of slot 5a in roller 5.

The upsetting of the inner edge of the strip 3 forms an exceedingly tight joint between the tube and the fin. It is to be noted that the union formed in this manner is dove-tailed for the reason that the upsetting of the edge of the strip is greatest at the points along the contact between the strip and the bottom of the groove and less in the metal of the strip more remotely removed from this contact.

This type of joint obviates any possibility of the tube releasing the fin, and permits heat to pass from the tube to the fin with substantially the same rapidity or efficiency as in the case when the fin is made integral with the tube. The joint between the tube and the fin or strip secured by the operation heretofore described is clearly illustrated in Figure 7.

By regulating the angular relation of the wheel 4 to the groove in the tube 21 the manner in which the inner edge of the strip or fin engages the side walls of the groove may be varied and controlled. If the wheel 4 is inclined as shown in Figure 2 the joint shown in Figure 8 may be obtained.

In this operation, the inner edge of the fin is turned upon itself as illustrated. This is due to the reason that, as the fin or strip 3 enters the groove, the inner edge of the strip engages with the side wall of the groove and turns upon itself.

It will also be understood that the expansion on the thickness of the metal about the inner edge of the strip is utilized in obtaining the joint shown in Figure 8. This expansion takes place while the fin is being pressed into the groove and during the period the inner edge of the strip or fin is being turned upon itself. The expansion of the metal about the inner edge of the fin or strip during the bending thereof added to the upsetting of the inner edge of the strip produces a joint between the tube and fin of great strength and durability.

The crimping wheel 5 follows the operation of the lead wheel 4. The wheel 5 has a peripherical beveled slot 5a which receives, guides and straddles the fin and its peripheral edges exerts a pressure against the metal of the tube lying adjacent the sides of the fin. The pressure of the wheel 5 may be adjusted so that sufficient metal is depressed along the edges of the fin receiving groove of the tube to seal the outer side walls of the groove against the adjacent walls of the fin as shown to advantage in Figure 7. Said wheel 5 is preferably formed of two discs having adjacent beveled outer edges forming a beveled slot 5a, Figure 4, one of said discs being preferably rigid with spindle 5' and the other being separate therefrom and secured thereto by a plurality of screws 17, the ribbon 3 being adapted to extend between said discs and said beveled edges of slot 5a, the screws 17 being adjusted to form the required clearance between said discs to snugly accommodate varying widths and thicknesses of said ribbon 3.

Sufficient pressure may be given wheel 5 to press the metal of the tube adjacent to the side walls of the fin to the extent shown in Figure 9. In this latter case the portion of the fin contiguous with the outer edges of the groove is depressed and the metal about the inner edge of the fin further depressed and the metal about the inner edge of the fin further expanded. This added expansion of the metal about the inner edge of the fin presses outwardly to a greater degree at the bottom portion of the walls of the fin receiving groove and produces a joint similar to that shown in Figure 9. In this last mentioned method the joint between the fin and the tube is strengthened. Also the joint produced has a high heat conductivity the same as in the cases with the joints shown in Figures 7 and 8.

In Figures 10 and 11, I have shown a section of a finned tube complete. At 20, I have indicated a series of prick-punch indentations equally spaced around the tube to constitute a securing means additional to that gained by knurling or plain rolling. The use of these indentations however is merely optional.

The circular recess in the juxtaposed parts of portions 6 and 7 is adapted to surround the heat exchange member 21 adjacent the points at which occur the thrust on member 21 of cutters 1 and bending rollers 4 and 5 and is adapted to act as a steady-rest for member 21 to overcome the effects thereon of said thrust.

While I have shown and described specific shapes of joints obtained by a definite relation between the diameter of the lead and crimp wheels with respect to that of the tube, in addition to the relative positions of the wheels and the pressure with which they operate, either upon the strip or the metal adjacent the strip, the type of joint may be modified to meet a given condition by changing the above described relations. It is also apparent that the forming of the groove may be done by a tool which is separate and distinct from the strip laying device or the knurler.

The herein described and shown product produced by this apparatus forms the subject matter of my co-pending application, Serial Number 251,589.

Further, although I have described my device as one in which the tool is stationary and the work rotates, I consider that any modification of the tool whereby the work remains stationary and the tool rotates about the work, is within the scope of my invention and mere mechanical skill as in actual production of the tubes of the character described I have used the tool in both methods of operation.

It will be understood that the above description and accompanying drawings comprehend only the general and preferred embodiment of my invention and that minor detail changes in the construction and arrangement of parts may be made within the scope of the appended claims without sacrificing any of the advantages of my invention.

The invention herein described may be manufactured and used by or for the Government of the United States for governmental purposes without the payment to me of any royalty thereon or therefor.

Having thus described my invention what I claim is:—

1. In an apparatus for uniting a fin and a tube for the production of finned tubes, the combination of a body member having a recessed portion adapted to receive a cylindrical tube, means for retaining the tube within the recess, means for forming a helical groove upon the tube, means for guiding the fin into the groove and means for simultaneously forcing the fin into the groove and bending the fin to conform to the contour of the groove.

2. In an apparatus for uniting a fin and a tube for the production of finned tubes, the combination of a body member having a recessed portion adapted to receive a tube having a helical groove, means for retaining the tube within the recess, means for guiding the fin into the groove and means for simultaneously forcing the fin into the groove and bending the fin to conform to the contour of the groove.

3. In an apparatus for uniting a fin and a tube for the production of finned tubes, the combination of a body member having a recessed portion adapted to receive a tube having a helical groove, means for retaining the tube within the recess and means for simultaneously guiding the fin into the groove, forcing the edge of the fin to the bottom of the groove and bending the fin to conform to the contour of the groove.

4. In an apparatus for uniting a fin and a tube for the production of finned tubes, the combination of a body member having a recessed portion adapted to receive a tube, an element mounted upon the body member and having an arcuate portion, said arcuate portion and said recessed portion forming a cylindrical passage corresponding in size to that of the tube, groove forming means mounted upon said element and positioned to form a groove in said tube when positioned within the cylindrical passage means mounted upon said element for guiding the fin into said groove, and means for simultaneously pressing said fin into the bottom of said groove and bending the fin to conform to the contour of said groove.

5. In an apparatus for uniting a fin and a tube for the production of finned tubes, the combination of a body member having a recessed portion adapted to receive a tube, an element mounted upon the body member and having an arcuate portion, said arcuate portion and said recessed portion forming a cylindrical passage corresponding in size to that of the tube, groove forming means mounted upon said element and positioned to form a groove in said tube when positioned within the cylindrical passage means mounted upon said element for guiding the fin into said groove and means for crimping the metal of the tube closely about the fin when wound upon the tube.

6. In an apparatus for uniting a fin and a tube for the production of finned tubes, the combination of a body member having a recessed portion adapted to receive a tube having a helical groove and element mounted upon the body member and having an arcuate portion, means for adjusting the element along the body portion toward and away from the recessed portion of the body member so that the arcuate portion of the element and the recessed portion of the body member form a cylindrical passage corresponding in size to the diameter of the tube, and means for simultaneously guiding the fin into the groove, forcing the edge of the fin to the bottom of the groove and bending the fin to conform to the contour of the groove.

7. In an apparatus for uniting a fin strip to a grooved member, the apparatus and said member being adapted to be relatively movable, and said apparatus being provided with means for conforming the fin strip to the contour of the groove in said member and simultaneously forcing the inner edge thereof into the groove of said member with the relative movement of the apparatus and said member.

8. In an apparatus for uniting a fin strip to a grooved member, the apparatus and said member being adapted to be relatively rotated, and said apparatus being provided with means adapted to bend the fin strip to conform to the contour of the groove and simultaneously force the inner edge of the strip into said groove with the relative rotation of the member and apparatus.

9. In an apparatus for uniting a fin strip to a grooved member, the apparatus and said member being adapted to be relatively rotated, and said apparatus being provided with a single means adapted to bend the strip to conform to the contour of the groove and simultaneously force the inner edge of the strip into said groove with the rotation of the member or body.

10. In an apparatus for uniting a fin strip to a grooved cylindrical member adapted to be rotated about its longitudinal axis, and said apparatus being provided with a member arranged, when in working position with the member, in off-set relation to the longitudinal axis of the cylindrical member and in alignment with said groove, and adapted to engage the strip and simultaneously bend and force the same into said groove with the rotation of said cylindrical member.

11. In an apparatus for uniting a fin strip to a grooved cylindrical member adapted to be rotated about its longitudinal axis, and said apparatus being provided with a rotatable member arranged, when in working position with the member, in off-set relation to the longitudinal axis of the cylindrical member and in alignment with said groove, and adapted to engage the strip and simultaneously bend and force the same into said groove with the rotation of said cylindrical member.

12. In an apparatus of the character described, a cylindrical member adapted to be rotated about its longitudinal axis, a tool adapted to be supported in operative relation to said cylindrical member, means carried by said tool for forming a groove about the cylindrical member with the rotation thereof, and means carried by said tool whereby a strip of metallic material can be simultaneously bent to fit the contour of the groove and forced therein with the rotation of said cylindrical member.

13. In an apparatus of the character described, a cylindrical member adapted to be rotated about its longitudinal axis, a tool adapted to be supported in operative relation to said cylindrical member, means carried by said tool whereby a strip of metallic material is simultaneously bent edgewise to the contour of the groove and its inner edge forced therein, and means carried by the tool for pressing the outer edges of the groove inwardly and about the metal strip after said strip is placed in said groove.

14. In an apparatus of the character described, means for rotating a cylindrical member about its longitudinal axis and shifting it longitudinally, a tool adapted to be arranged in operative relation to said cylindrical member, means carried by the tool whereby a spiral groove will be formed in the cylindrical member with the combined rotative and longitudinal movement thereof, means carried by the tool whereby a metal strip may be bent edgewise to correspond to the contour of said groove and its inner edge forced into the groove simultaneously with the bending thereof, and means whereby the edge of the strip entering the groove may be inclined to engage a wall of the groove while being forced therein.

15. In an apparatus for uniting a fin and a tube for the production of finned tubes, the combination of a body member having a recessed portion adapted to receive a tube having a helical groove, an element mounted upon the body member and having an arcuate portion, means for adjusting the element along the body portion toward and away from the recessed portion of the body member so that the arcuate portion of the element and the recessed portion of the body member form a cylindrical passage corresponding in size to the diameter of the tube, means for guiding the fin into the groove and means for simultaneously forcing the edge of the fin to the bottom of the groove and bending the fin to conform to the contour of the groove.

16. In an apparatus for uniting a fin and a tube for the production of finned tubes, the combination of a body member having a recessed portion adapted to receive a tube having a helical groove, an element mounted upon the body member and having an arcuate portion, means for adjusting the element along the body portion toward and away from the recessed portion of the body member so that the arcuate portion of the element and the recessed portion of the body member form a cylindrical passage corresponding in size to the diameter of the tube, means mounted upon said element for guiding the fin into the groove and means for simultaneously forcing the edge of the fin to the bottom of the groove and bending the fin to conform to the contour of the groove.

17. In an apparatus for uniting a fin and a tube for the production of finned tubes, the combination of a body member having a recessed portion adapted to receive a tube, an element mounted upon the body member and having an arcuate portion, means for adjusting the element along the body member so that the arcuate portion of the element and the recessed portion of the body form a cylindrical passage of substantially the same diameter as that of the tube, a tripple grooving cutter mounted upon one side of the element and extending within the cylindrical passage to the depth of the groove to be cut, fin guiding means mounted upon the other side of the element, a lead wheel mounted upon said body member and in alignment with said guiding means, and a crimping wheel mounted upon the body member and in alignment with the guiding means and lead wheel.

18. In an apparatus for uniting a fin and a tube for the production of finned tubes, the combination of a body member having a recessed portion adapted to receive a tube, an element mounted upon the body member and having an arcuate portion, means for adjusting the element along the body member so that the arcuate portion of the element and the recessed portion of the body form a cylindrical passage of substantially the same diameter as that of the tube, a triple grooving cutter mounted upon one side of the element and extending within the cylindrical passage to the depth of the groove to be cut, fin guiding means mounted upon the other side of the element, a lead shell mounted upon said body member and in alignment with said guiding means, and a crimping wheel mounted upon the body member and in alignment with the guiding means and lead wheel, said lead wheel positioned at a point with respect to the tube and the fin so that the lead wheel crushes the edge of the tube to the bottom of the groove simultaneously with the bending of the fin to the contour of said tube.

19. In an apparatus for uniting a fin and heat exchanger member for the production of heat exchanger finned members, the combination of a body member, means on said body member for placing the fin material under longitudinal tension, and means on said body member for forming said fin externally about and in fixed binding thermal contact with said heat exchanger member while said fin material is under said tension.

20. In an apparatus for uniting a fin and heat exchanger member for the production of heat exchanger finned members, the combination of means for placing said fin material under longitudinal tension, means for pressing said fin material against and to conform to the external contour of and binding the same throughout its extent in fixed thermal contact with said member while said fin material is under said tension, and means for counteracting an effect of stress on said heat exchanger member occasioned by the last stated means.

21. In an apparatus for uniting a fin and heat exchanger member for the production of heat exchanger finned members, the combination of means for forming said material externally about and in thermal contact with said member, and means for displacing material of said member in fixed securing engagement with the adjacent portion of the fin while said fin is subjected to said forming stress.

22. In an apparatus for uniting a fin and heat exchanger member for the production of heat exhanger finned members, the combination of means for forming fin material externally about said heat exchanger member with its adjacent edge beneath the normal surface of and in binding thermal contact throughout its length with said member, and means for laterally displacing adjacent material of said member in fixed substantially continuous thermal engagement with the adjacent portion of said fin while said fin is subjected to said forming stress.

23. In an apparatus for forming separate fin-stripped heat exchanger members, the combination of means for forming a groove about a heat exchanger member, means for inserting an edge of said strip into said groove, and means for upsetting an edge of said strip against the sides of said groove.

24. In an apparatus for forming separate fin-stripped heat exchanger members, the combination of means for forming a groove about said members, means for inserting an edge of the fin strip into said groove, and means for upsetting said inserted edge of said strip within said groove.

25. In an apparatus for forming separate fin-stripped heat exchanger members, the combination of means for forming a groove about said members, means for inserting an edge of the fin strip into said groove, means for upsetting said inserted edge of said strip against the sides of said groove, and means for crimping the edges of said groove.

26. In an apparatus for forming separate fin-stripped heat exchanger members, the combination of means for forming a continuous groove about said members, means for inserting an edge of said strip into said groove, and means for upsetting said inserted edge of said strip against the bottom and sides of said groove.

27. In an apparatus for forming separate fin-stripped heat exchanger members, the combination of means for forming a groove about said members, means for inserting an edge of said strip into said groove at an angle to said member and to engage a side wall of said groove, and means for upsetting said inserted edge of said strip within said groove.

28. In an apparatus for forming separate fin-stripped heat exchanger members, the combination of means for forming a groove about said members, means for inserting an edge of the strip into said groove, and means for coiling said strip about said member and into said groove and thickening said inserted edge of said strip within said groove and producing a good heat-conducting contact between said strip and member, said first named means counteracting the lateral stress on said member of said coiling means.

29. In an apparatus for forming separate fin-stripped heat exchanger members, the combination of means for forming a continuous spiral groove about said members, means for inserting an edge portion of the strip into said groove, means for progressively coiling said strip about said member and into said groove, and means for crimping an edge of said groove against said strip in said groove.

30. In an apparatus for forming separate fin-stripped heat exchanger members, the combination of means adjustable relative to and for progressively forming a continuous spiral groove about said member, means for placing under stress and inserting an edge portion of the strip into said groove, means for progressively coiling said strip about said member and into said groove, and means for progressively crimping each edge of said groove against said material in said groove.

31. In an apparatus for uniting a fin and a cylinder for the production of heat exchanger finned members, the combination of a body member having a shank adapted to be mounted in the tool post of a lathe or the like, said body member having a recessed portion, a member slidably mounted upon said body member and having a recessed portion adapted to be juxtaposed to the recessed portion of said body member, said juxtaposed recessed portions being adapted to receive and support the cylinder, and means for securing said adjustable member to said body member.

32. In an apparatus for uniting a fin and a cylinder for the production of heat exchanger finned members, the combination of a body member having a shank adapted to be mounted in the tool post of a lathe or the like, said body member having a recessed portion, a member slidably mounted upon said body member and having a recessed portion adapted to be juxtaposed to the recessed portion of said body member, said juxtaposed recessed portions being adapted to receive and support the cylinder, means for securing said adjustable member to said body member, and means mounted upon said adjustable member for forming a groove in the cylinder.

33. In an apparatus for uniting a fin and a cylinder for the production of heat exchanger finned members, the combination of a body member having a fin adapted to be mounted in the tool post of a lathe or the like, a member slidably mounted upon said body member, means for securing said slidable member to said body member, and means mounted upon said slidable member for forming a groove in the cylinder.

34. In an apparatus for uniting a fin and a cylinder for the production of heat exchanger finned members, the combination of a body member having a fin adapted to be mounted in the tool post of a lathe or the like, a member slidably mounted upon said body member, means for securing said slidable member to said body member, and a revolvable means having its axes of rotation at an angle to the longitudinal axis of the cylinder and supported by said adjustable member for forming a groove in the cylinder.

35. In an apparatus for uniting a fin and a cylinder for the production of heat exchanger finned cylinders, means for coiling a substantially flat fin edgewise about the cylinder, said means including a grooved roller adapted to receive the fin, said roller being divided into two parts substantially on opposite sides of the groove adapted to receive the fin, and means for adjustably securing together the divided portions of said roller.

36. In an apparatus for uniting a fin and a cylinder for the production of heat exchanger finned cylinders, means for helically coiling a substantially flat thin fin about the cylinder including a plurality of rollers each revolvably mounted at an angle relative to one of said rollers, and each of said rollers having a groove in its periphery adapted to receive the fin.

37. In an apparatus for uniting a fin and a cylinder for the production of heat exchanger finned members, the combination of means for helically coiling a substantially flat fin edgewise about a cylinder, including a plurality of grooved rollers revolvably mounted at an angle, and means for subjecting said fin to substantial longitudinal stress while the fin is being coiled about the cylinder, said last named means and the grooves of each of said rollers being in the line of progression of said fin as it is being coiled about the cylinder.

38. In a machine for winding and securing a helical metal fin on a metal tube, a tool operable to form a helical groove in the exterior of said tube, means for seating a metal ribbon edgewise in said groove comprising a wheel having a peripheral groove through which the ribbon passes to support the ribbon against buckling, means for applying tension to the ribbon as it approaches said wheel, and a tool operable to compress the metal of said tube adjacent said groove into gripping engagement with said ribbon whereby said ribbon is firmly secured in said groove.

ALFRED J. BERG.